Feb 4, 1936.   J. R. MERRIAM   2,029,581
INTAKE VALVE DEFLECTOR
Filed May 6, 1932   2 Sheets-Sheet 2
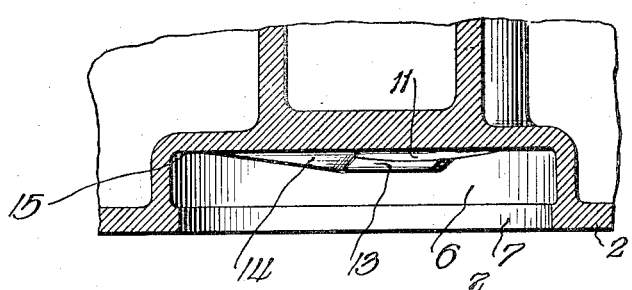
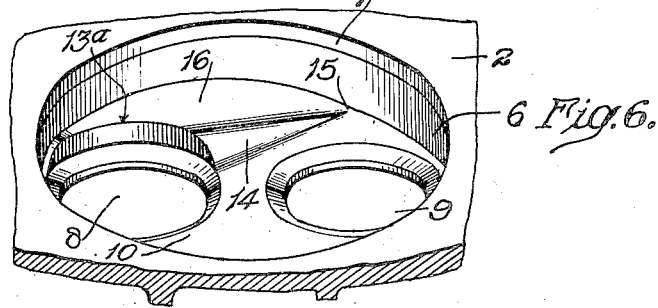
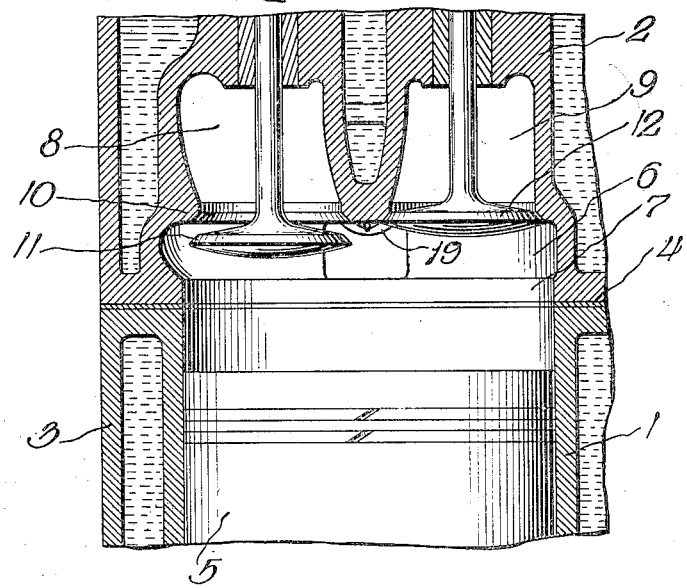
Inventor:
Jesse R Merriam
By Brown, Jackson, Boettcher + Dienner.
Attys.

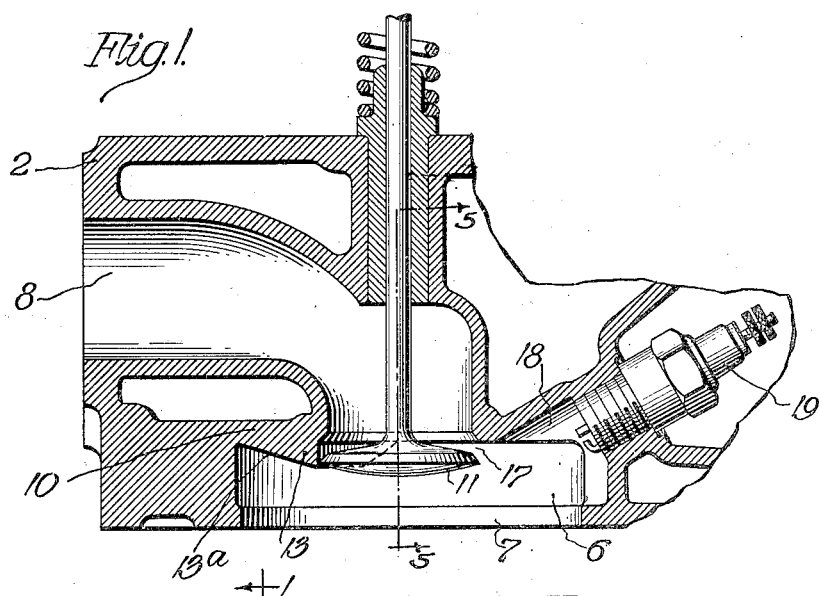
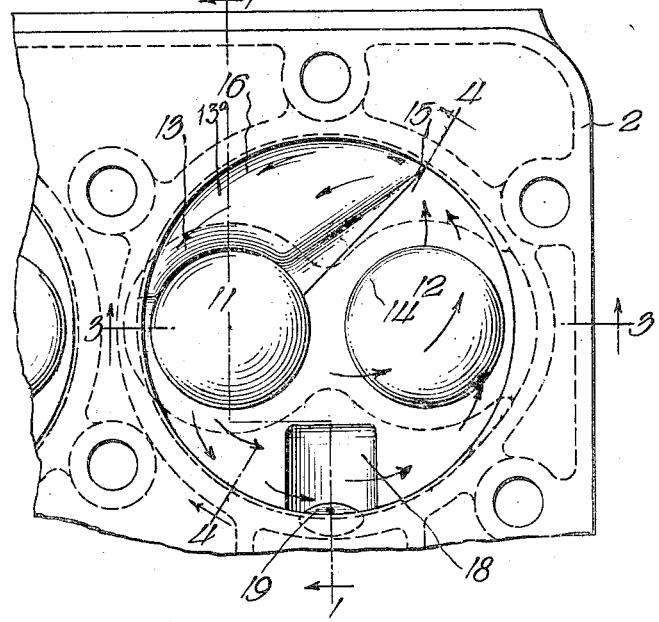
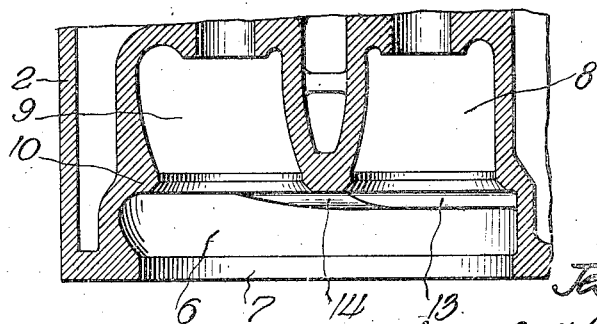

Patented Feb. 4, 1936

2,029,581

UNITED STATES PATENT OFFICE 2,029,581

INTAKE VALVE DEFLECTOR

Jesse Roger Merriam, Waukesha, Wis., assignor to Waukesha Motor Company, Waukesha, Wis., a corporation of Wisconsin Application May 6, 1932, Serial No. 609,635

5 Claims. (Cl. 123—191)

This invention relates to internal combustion engines, and has to do with an engine of the aspiration type in which a combustible mixture of air and fuel is drawn into the cylinder during the suction stroke of the piston.

The primary object of my invention is to obtain high turbulence and rapid combustion of the fuel mixture charge, assuring high efficiency and smooth operation of the engine. Further objects and advantages of my invention will appear from the detail description.

In the drawings:—

Figure 1 is a vertical sectional view through the head of an engine embodying my invention, taken substantially in the plane of section line 1—1 of Figure 2;

Figure 2 is a fragmentary underneath view of the head;

Figure 3 is a sectional view taken substantially on line 3—3 of Figure 2;

Figure 4 is a sectional view taken substantially on line 4—4 of Figure 2;

Figure 5 is a vertical sectional view through the head and the cylinder of the engine taken substantially on the plane of line 5—5 of Figure 1, certain parts being shown in elevation;

Figure 6 is a fragmentary perspective view of the under side of the engine head.

I have illustrated my invention, by way of example, as applied to an internal combustion engine comprising a cylinder 1, a head 2 suitably mounted upon the cylinder block 3, there being a gasket 4 disposed between the cylinder block and the head, and a piston 5 operating in the cylinder. While I prefer to have the head 2 separate from the cylinder block, my invention comprehends an engine in which the cylinder block and the head are formed integrally. The cylinder block and the head are provided with suitable openings and spaces for circulation therethrough of a cooling liquid, such as water, in a known manner.

The head is provided, in its under face, with a combustion chamber 6, the lower portion 7 of which is slightly reduced and is disposed in registry with the upper end of the cylinder bore to form a continuation thereof. Head 2 is provided with fuel mixture inlet and burned gas outlet passages 8 and 9, respectively, which open, at their outer ends, through the sides of the head. These passages open, at their inner ends, through the ceiling or roof 10 of the combustion chamber and are controlled by valves 11 and 12, respectively. These valves are of the well known type and are mounted and operated in a well known manner, the openings controlled by the valves being suitably shaped to provide seats for such valves.

A deflector 13, formed integrally with ceiling 10, depends from the roof of combustion chamber 6 and extends from the wall of this chamber adjacent inlet valve 11 about this valve for a portion of the circumference thereof. This deflector approximates a segment of the combustion chamber and increases in height from the circumferential wall thereof and toward the inlet valve 11, as shown. The valves 11 and 12 are preferably disposed in alignment diametrically of the chamber 6 and the cylinder bore, the plane of the axes of these valves coinciding with the plane of the cylinder axis, although this is not essential. A deflecting element 14, in the form of a shoulder formed integrally with the deflector 13 and with ceiling 10, extends from the inner side of valve 11 toward the opposite side of the surrounding wall of the combustion chamber. This element decreases in height toward the surrounding wall of the combustion chamber and terminates short of such wall to provide a restricted passage 15 between the outer end of element 14 and the adjacent wall of the chamber, this passage giving access from the main portion of the combustion chamber to a space 16 enclosed by deflector 13 and element 14 and a portion of the circumferential wall of the combustion chamber. It will be noted that element 14 is inclined outwardly away from the exhaust valve 12 and is disposed at the same side of the plane of the axes of the valves 11 and 12 as is the deflector 13. The space 16 is thus of materially less volume than the remaining space of the combustion chamber. Due to the arcuate shape of deflector 13, the space 16, at the portion thereof extending about the inlet valve 11, is of approximately spiral shape, converging in width toward the circumferential wall of the combustion chamber and to the outer end of deflector 13.

Referring more particularly to Figures 1, 3, 4 and 6, the deflector 13 extends about the inlet valve 11 in close proximity thereto and is of proper height to close the space between this valve and its seat for a portion of the circumference of the valve, when the valve is in open position, as in Figure 1. Valve 11 is disposed with its axis parallel to the cylinder axis and, when in open position, defines, with the adjacent portion of ceiling 10, an inlet opening 17 which is disposed approximately tangentially of the combustion chamber and the cylinder bore and toward the exhaust valve 12. The under face 13a of deflector 13 is inclined downwardly from ceiling 10 and inwardly from the side wall of combustion chamber 6 to the lower edge of the deflector. A pocket 18 opens into the combustion chamber and accommodates the inner end of a spark plug 19, of known type, mounted in the head in a well known manner.

On the suction stroke of the piston 5, the fuel mixture is drawn through opening 17 and enters the combustion chamber, this entering fuel mixture flowing parallel with the ceiling of the chamber and tangential to the chamber wall and the cylinder wall. The entering charge is thus crowded toward the surrounding wall of the combustion chamber and is caused to flow over the hot exhaust valve 12 in contact therewith, as indicated by the arrows in Figure 2. The heat of the exhaust valve is thus utilized to vaporize the entrained globules or particles of unvaporized fuel, thereby cooling the exhaust valve and eliminating a possible hot spot in the combustion chamber. The fuel mixture charge is then crowded toward and through the restricted passage 15 by the wall of the combustion chamber and the deflecting element 14. As the charge enters the space 16 it expands and is then again crowded toward the wall of the chamber by the deflector 13 so as to be again contracted, the charge being then deflected downwardly by the deflector 13 into the cylinder bore and toward the cylinder wall. During the compression stroke of the piston, the charge of fuel mixture, which has had high rotary turbulence imparted thereto, due to its tangential admission to the combustion chamber, as above described, is compressed in the combustion chamber, the deflector 13 and element 14 contributing to increased high turbulence of the fuel mixture, and the mixture is then ignited by the spark plug.

I find that the provision of the deflector 13 and associated parts, and the relation of the intake and exhaust valves in the manner disclosed, results in a material increase in efficiency and smoothness in operation of the engine as compared to a conventional overhead valve engine.

What I claim is:—

1. In combination in an internal combustion engine of the aspiration type, a cylinder, a piston operating in the cylinder, a head provided with fuel mixture inlet and burned gas outlet passages opening through the head over the cylinder area, overhead inlet and exhaust valves controlling said passages, a downwardly projecting deflector extending about the inlet valve at one side and for a portion of the circumference thereof remote from the exhaust valve, the area of the ceiling of said cylinder head between the other side of said inlet valve and said exhaust valve being flat and substantially normal to the cylinder axis and free of downward projections tending to deflect the entering charge away from said exhaust valve, said deflector being of a height to partially close the space between the under face of the head and the upper face of the inlet valve when the latter is in open position thereby causing the entering charge of fuel mixture to flow toward and over the hot exhaust valve in contact therewith, and spark means for igniting the fuel mixture charge.

2. In combination in an internal combustion engine, a cylinder, a piston operating in the cylinder, a head provided with inlet and burned gas outlet passages opening through the head over the cylinder area, overhead valves controlling said passages, a deflector on the under face of the head and extending downwardly therefrom about the inlet valve for a portion of the circumference thereof remote from the exhaust valve, and a deflecting element extending from the inner end of the deflector and inclined toward the surrounding wall of the combustion chamber, said element terminating short of said wall and defining therewith a restricted passage for the charge, said deflector being of a height to partially close the space between the under face of the head and the upper face of the inlet valve when the latter is in open position thereby causing the entering charge to flow toward and over the hot exhaust valve in contact therewith.

3. In combination in an internal combustion engine, a cylinder and a head together defining a cylinder and a substantially cylindrical combustion chamber opening into the upper end of the cylinder, the head having inlet and burned gas outlet passages opening through the head over the cylinder area, a piston operating in the cylinder, and overhead valves controlling said passages, the head being provided with a deflector depending from the roof of the combustion chamber and approximating a segment thereof, the deflector increasing in height inwardly of the combustion chamber from the circumferential wall thereof and toward the inlet valve, one end portion of the deflector extending about a portion of the circumference of the inlet valve remote from the exhaust valve and acting to direct the entering charge toward and over the hot exhaust valve in contact therewith, a portion of the inner side of the deflector extending from the inner side of the inlet valve along a chord of the combustion chamber and tapering in height toward the circumferential wall of the latter.

4. In combination in an internal combustion engine, a cylinder, a piston operating therein, a head defining a combustion space overlying the cylinder and provided with inlet and burned gas outlet passages opening through the head over the cylinder area, overhead valves controlling said passages, and a deflector on the under face of the head and extending downwardly therefrom about the inlet valve for a portion of the circumference of the latter remote from the exhaust valve, said deflector being of a height to partially close the space between the under face of the head and the upper face of the inlet valve when the latter is in open position and acting to cause the entering charge to flow toward and over the hot exhaust valve in contact therewith, the deflector being inclined downwardly and inwardly of the cylinder for deflecting the charge downwardly into the cylinder after said charge has flowed substantially completely around the combustion space at the upper end of the cylinder.

5. In combination in an internal combustion engine, a cylinder, a piston operating therein, a head defining a combustion space overlying the cylinder and provided with inlet and burned gas outlet passages opening through the head over the cylinder area, overhead valves controlling said passages, and a deflector on the under face of the head and extending downwardly therefrom about the inlet valve for a portion of the circumference of the latter remote from the exhaust valve, said deflector being of a height to partially close the space between the under face of the head and the upper face of the inlet valve when the latter is in open position and acting to cause the entering the hot exhaust valve in contact therewith, the deflector being inclined downwardly and inwardly of the cylinder for deflecting the charge downwardly into the cylinder after said charge has flowed substantially completely around the combustion space at the upper end of the cylinder, said deflector comprising a deflecting element extending from the inner side of the inlet valve along a chord of the combustion chamber and tapering in height toward the circumferential wall of the latter.

JESSE ROGER MERRIAM.